US006477937B1

(12) United States Patent
Horn et al.

(10) Patent No.: US 6,477,937 B1
(45) Date of Patent: Nov. 12, 2002

(54) VALVE ARRANGEMENT INCLUDING RELEASE VALVE

(75) Inventors: Edward R. Horn, Oconomowoc, WI (US); Robert E. Dowd, Oconomowoc, WI (US)

(73) Assignee: Aladdin Engineering & Manufacturing, Waukesha, WI (US)

( * ) Notice: Subject to any disclaimer, the term of this patent is extended or adjusted under 35 U.S.C. 154(b) by 0 days.

(21) Appl. No.: 09/460,443

(22) Filed: Dec. 13, 1999

(Under 37 CFR 1.47)

(51) Int. Cl.[7] .......................... F15B 11/08; G05D 11/00
(52) U.S. Cl. ....................... 91/464; 137/596.2; 137/112
(58) Field of Search ............................. 137/625.4, 901, 137/596.2, 112, 602, 605, 601.13, 601.19, 601.2, 601.21; 91/445, 464

(56) References Cited

U.S. PATENT DOCUMENTS

| | | | | |
|---|---|---|---|---|
| 1,146,850 A | | 7/1915 | Cullum | |
| 1,179,468 A | * | 4/1916 | Stenning | 137/625.4 X |
| 2,585,045 A | | 2/1952 | Schmidlin | |
| 2,667,896 A | * | 2/1954 | Kanuch | 137/614.11 |
| 2,728,564 A | | 12/1955 | Bracke | |
| 2,757,516 A | * | 8/1956 | Buttolph | 137/112 X |
| 2,959,188 A | | 11/1960 | Kepner | |
| 3,004,549 A | | 10/1961 | Temple | |
| 3,025,077 A | * | 3/1962 | Alfieri | 137/599.11 |
| 3,229,721 A | | 1/1966 | Bingel | |
| 3,335,750 A | | 8/1967 | Kepner | |
| 3,613,508 A | * | 10/1971 | Krehbiel et al. | 91/464 X |

(List continued on next page.)

FOREIGN PATENT DOCUMENTS

| | | |
|---|---|---|
| JP | 65403 | 4/1982 |

OTHER PUBLICATIONS

Kepner Products Company; Hydraulic and pneumatic check and relief check valves.

*Primary Examiner*—John E. Ryznic
(74) *Attorney, Agent, or Firm*—Michael Best & Friedrich LLP

(57) ABSTRACT

A valve arrangement including a release valve. The valve arrangement controls a piston of a cylinder assembly upon interruption of a source of fluid pressure supplied to the cylinder assembly, the cylinder assembly including a first port and a second port and slideably housing the piston for movement between an extended position and a retracted position. The valve arrangement includes a valve assembly in fluid communication with the source of fluid pressure and with the first port and the second port to control fluid flow between the source of fluid pressure on the first port and between the source of fluid pressure on the second port, and a release valve fluidly connected to the first port and to the second port, the release valve being operable to control flow of fluid from the first port and from the second port. The release valve includes a release valve body including a release valve bore in fluid communication with the first port and with the second port, the release valve body further including a release valve seat, and a release valve member movable between a closed position, in which the release valve member engages the release valve seat to prevent fluid flow through the release valve bore, and an open position, in which fluid flows from at least one of the first port and the second port and through the release valve bore. Preferably, the release valve includes a manually engageable portion operable to allow fluid flow from the first port and the second port.

36 Claims, 8 Drawing Sheets

U.S. PATENT DOCUMENTS 3,792,715 A 2/1974 Parrett et al.
3,817,154 A 6/1974 Martin
3,828,821 A * 8/1974 Dotter ................. 137/625.4 X
3,841,551 A * 10/1974 Ota ..................... 137/625.4 X
3,893,481 A * 7/1975 Watts .................. 137/625.4 X
3,903,914 A * 9/1975 Topham-Clements .... 137/68.23
3,975,987 A 8/1976 Panis
3,980,336 A 9/1976 Bitonti
4,018,136 A 4/1977 Kaetterhenry
4,052,035 A * 10/1977 Kenny et al. ................. 251/14
4,065,096 A * 12/1977 Frantz et al. ............ 251/129.1
4,072,087 A 2/1978 Mueller
4,073,311 A 2/1978 McGeachy
4,103,699 A 8/1978 Vik
4,171,007 A 10/1979 Bouteille
4,172,582 A 10/1979 Bobnar
4,175,588 A * 11/1979 Gute ....................... 137/625.4
4,192,338 A 3/1980 Gerulis
4,287,812 A 9/1981 Iizumi
4,531,449 A 7/1985 Reith
4,624,445 A 11/1986 Putnam
4,667,570 A 5/1987 Jensen, Jr. et al.
4,742,849 A 5/1988 Prudhomme et al.
4,815,692 A * 3/1989 Loiseau et al. ............... 251/14
4,838,406 A 6/1989 Horn et al.
5,081,094 A 1/1992 Horn et al.
5,159,872 A * 11/1992 Dettmers et al. ....... 137/901 X
5,295,508 A * 3/1994 Reisinger ................. 137/625.4

* cited by examiner

VALVE ARRANGEMENT INCLUDING RELEASE VALVE

FIELD OF THE INVENTION

The invention relates to fluid-operated devices and, more particularly, to a valve arrangement including a release valve for controlling a fluid-operated device.

BACKGROUND OF THE INVENTION

A cylinder assembly is a typical fluid-operated device. Generally, the cylinder assembly includes a cylinder having first and second ports and slideably housing a piston for movement between extended and retracted positions to move a load. To control movement of the piston and the load, a valve assembly is provided in fluid communication with a source of fluid pressure and with one or both of the ports of the cylinder assembly. The valve assembly may include a locking valve which operates to control movement of the piston upon interruption of the source of fluid pressure.

In one construction, a single locking valve is in fluid communication with one port and controls movement of the piston upon interruption of a source of fluid pressure to only that port. In another construction, a locking valve is fluidly connected to each port, and each locking valve operates independently to control movement of the piston upon interruption of the source of fluid pressure supplied to the corresponding port. In either construction, the locking valve operates to maintain the piston and the load supported by the cylinder assembly in a relatively stationary position after the interruption of the source of fluid pressure.

To release the fluid pressure from the system after operation of a locking valve, a release valve may be incorporated into the valve assembly. An example of such a release valve is disclosed in U.S. Pat. No. 4,838,306.

SUMMARY OF THE INVENTION

One of the problems with the above-described valve arrangement having a single locking valve and a single release valve connected to one port of the cylinder assembly is that, when the release valve is operated to release the fluid pressure from the system, the piston moves relative to the cylinder, and, therefore, the load also moves.

One problem with the above-described valve arrangement having a locking valve and a release valve connected to each port is that each release valve operates independently, allowing the position of the piston and the load to drift as fluid pressure is released from the system.

Another problem with the above-described valve arrangement having a locking valve and a release valve connected to each port is that, because each release valve is operated independently, an operator has difficulty simultaneously operating each release valve and maintaining the load in a relatively stationary position.

A problem with designing a release valve which controls the release of fluid pressure from both ports, simultaneously, is that, during operation of the valve assembly and during operation of the release valve, the release valve must prevent each locking valve connected to the corresponding port from being in fluid communication with the other locking valve.

The present invention provides a valve arrangement including a release valve that alleviates the problems with the above-described valve arrangements. The release valve is easy to operate and controls the release of fluid pressure from the first and second ports to maintain the position of the piston and to thereby prevent drifting of the load.

Specifically, the present invention provides a valve arrangement for controlling movement of a piston of a cylinder assembly upon interruption of a source of fluid pressure supplied to the cylinder assembly, the cylinder assembly including a first port and a second port and slideably housing the piston for movement between an extended position and a retracted position. The valve arrangement comprises a valve assembly in fluid communication with the source of fluid pressure and with the first port and the second port to control fluid flow between the source of fluid pressure and the first port and between the source of fluid pressure and the second port, and a release valve fluidly connected to the first port and to the second port, the release valve being operable to control flow of fluid from the first port and from the second port.

The valve assembly may have a valve body including a valve bore in fluid communication with the source of fluid pressure and with the first port and the second port. Preferably, the release valve includes a release valve body, defining a release valve bore in fluid communication with the valve bore and a release valve seat. The release valve also preferably includes a release valve member movable between a closed position, in which the release valve member engages the release valve seat to prevent fluid flow through the release valve bore, and an open position, in which fluid flows from the first port and the second port, through the valve bore and through the release valve bore. The release valve preferably further includes a biasing member biasing the release valve member to the closed position.

Preferably, when the release valve member is in the open position, fluid flows from the both the first port and the second port simultaneously. In addition, when the release valve member is in the open position, a substantially equal amount of fluid preferably flows from the first port and from the second port.

The release valve preferably further includes a release plunger operable to move the release valve member to the open position. Preferably, a manually engageable portion is connected to the release plunger and is engageable by an operator to cause the release plunger to move the release valve member to the open position. The release valve may include a piston portion connected to the release plunger, and a pilot fluid pressure applied to the piston portion may cause the release plunger to move the release valve member to the open position.

The release valve may also include means for biasing the release plunger out of engagement with the release valve member. In one construction, the biasing means may include a biasing member biasing the release plunger out of engagement with the release valve member. In another construction, the biasing means includes a piston portion connected to the release plunger, and a pilot fluid pressure applied to the piston portion biases the release plunger out of engagement with the release valve member. In either construction, the manually engageable portion is engageable by the operator to overcome the biasing force of the biasing member or the pilot fluid pressure to cause the release plunger to move the release valve member to the open position.

The valve assembly may include a first valve having a first valve body including a first valve bore in fluid communication with the source of pressure and the first port, and a second valve having a second valve body including a second valve bore in fluid communication with the source of fluid pressure and the second port. Preferably, the release valve bore is in fluid communication with the first valve bore and with the second valve bore, and, when the release valve member is in the open position, fluid flows from the first port, through the first valve bore, and through the release valve bore and fluid flows from the second port, through the second valve bore, and through the release valve bore.

In such constructions, when the release valve member is in the open position, fluid preferably flows from both the first valve bore and the second valve bore simultaneously. Also, when the release valve member is in the open position, a substantially equal amount of fluid preferably flows from the first valve bore and from the second valve bore.

The release valve body may further define a first release valve seat between the first valve bore and the release valve bore. The release valve preferably further includes a first release valve member movable between a closed position, in which the first release valve member engages the first release valve seat to prevent fluid flow between the first valve bore and the release valve bore, and an open position, in which fluid flows between the first valve bore and the release valve bore. A biasing member preferably biases the first release valve member to the closed position.

Similarly, the release valve body may further define a second release valve seat between the second valve bore and the release valve bore. The release valve preferably further includes a second release valve member movable between a closed position, in which the second release valve member engages the second release valve seat to prevent fluid flow between the second valve bore and the release valve bore, and an open position, in which fluid flows between the second valve bore and the release valve bore. A biasing member also preferably biases the second release valve member to the closed position.

The valve arrangement may include a flow control valve in fluid communication with the valve assembly to control fluid flow to the source of fluid pressure from at least one of the first port and the second port.

In some constructions, as discussed above, the valve assembly includes a first valve in fluid communication with the source of fluid pressure and the first port and a second valve in fluid communication with the source of fluid pressure and the second port. Preferably, the first and second valves cooperate such that, when fluid is supplied to the first port, fluid flows from the second port to allow the piston to move between the extended position and the retracted position and such that, when fluid is supplied to the second port, fluid flows from the first port to allow the piston to move between the extended position and the retracted position.

Preferably the valve arrangement further includes a cooperating plunger member positioned between the first valve and the second valve. The cooperating plunger member is operable to move the first valve member to the open position when fluid is supplied from the source of fluid pressure to the second port and to move the second valve member to the open position when fluid is supplied from the source of fluid pressure to the first port. Preferably, a biasing assembly biases the cooperating plunger member to a neutral position, in which the cooperating plunger member does not move the first valve member to the open position and does not move the second valve member to the open position.

One advantage of the present invention is that, when the release valve is operated to release fluid pressure, the piston is not allowed to move so that the load is maintained in a substantially stationary position.

Another advantage of the present invention is that, because the release valve simultaneously controls fluid flow from the first and second ports, the load does not drift when the release valve is operated.

Yet another advantage of the present invention is that, because a single release valve releases fluid pressure simultaneously from the first and second ports, the release valve is easier to operate to maintain the piston and the load in the substantially stationary position.

A further advantage of the present invention is that the release valve prevents the first and second valves from being in fluid communication during operation of the valve arrangement and during operation of the release valve.

Other features and advantages of the invention will become apparent to those skilled in the art upon review of the following detailed description, claims and drawings.

DESCRIPTION OF THE DRAWINGS

FIG. 5 is a partial cross-sectional view of a second alternative construction of the release valve illustrated in FIGS. 2, 3A and 3B.

Figure 1A:
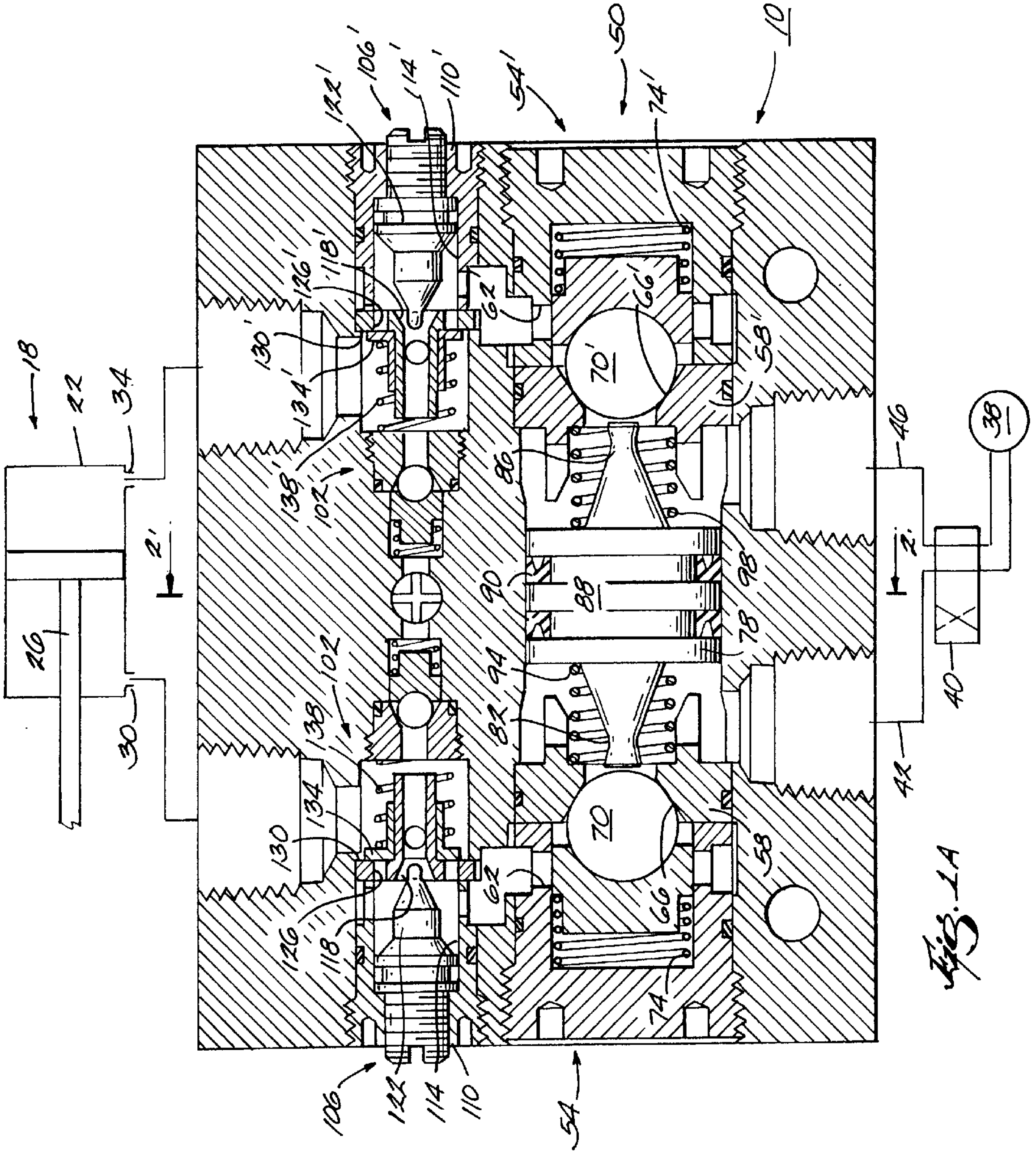
FIGS. 1A, 1B and 1C are partial cross-sectional views of a portion of a valve arrangement for use with a cylinder assembly and illustrating the operational conditions of the valve assembly.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 2:
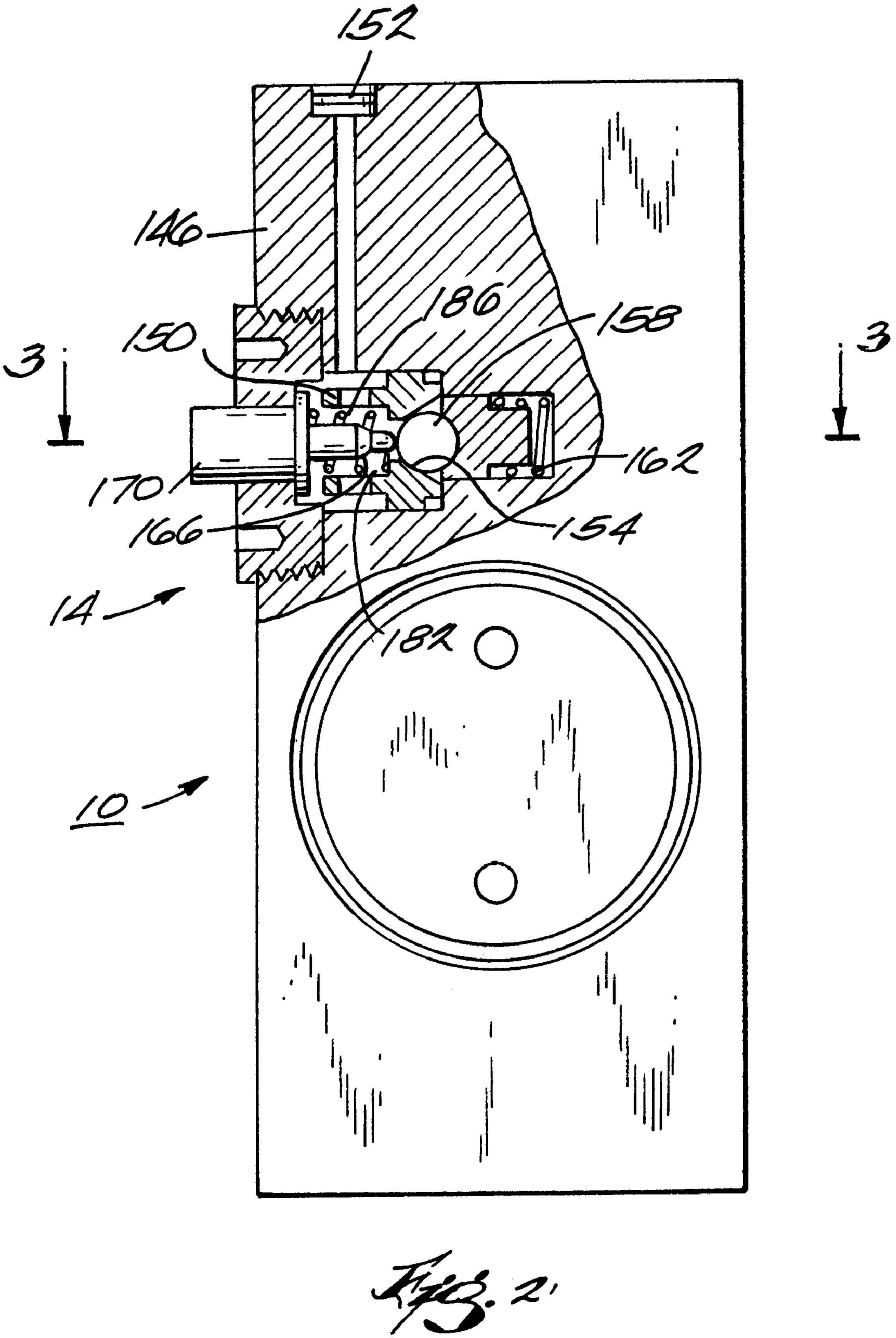
FIG. 2 is a partial cross-sectional view of the valve arrangement taken generally along line 2—2 in FIG. 1A.

A valve arrangement 10 including a release valve 14 embodying the invention is illustrated in FIGS. 1A and 2. The valve arrangement 10 is used to control a fluid-operated device, such as a cylinder assembly 18. The cylinder assembly 18 includes a cylinder 22 which slideably houses a piston 26 for movement between an extended position (to the left in FIG. 1A) and a retracted position (to the right in FIG. 1A) to move a load (not shown), if provided. The cylinder assembly 18 also includes a first port 30 and a second port 34. The valve arrangement 10 fluidly connects a source 38 of fluid pressure, preferably air pressure, to the cylinder assembly 18 and is operable to control movement of the piston 26 and to, therefore, control movement of the load, upon interruption of fluid pressure supplied to the cylinder assembly 18. It should be understood that, in other constructions (not shown), the valve arrangement 10 may be used to control other fluid-operated devices.

A directional control valve 40 is provided between the source 38 of fluid pressure and the valve arrangement 10 and controls the direction in which fluid pressure is supplied to the valve arrangement 10 and to the cylinder assembly 18 to control the direction of movement of the piston 26 and the load. A first supply line 42 and a second supply line 46 are connected between the directional control valve 40 and the valve arrangement 10.

The valve arrangement 10 includes a valve assembly 50 in fluid communication with the source 38 of fluid pressure and with the first port 30 and the second port 34 to control fluid flow between the source 38 of fluid pressure and the first port 30 and between the source 38 of fluid pressure and the second port 34. In the illustrated construction, the valve assembly 50 includes a first valve 54, in fluid communication with the source 38 of fluid pressure and the first port, and a second valve 54', in fluid communication with the source 38 of fluid pressure and the second port 34. The first and second valves 54 and 54' are identical, and, accordingly, only the first valve 54 will be described in detail. Corresponding elements of the second valve 54' have the same reference number "'".

The first valve 54 includes a valve body 58 defining a valve bore 62 in fluid communication with the source 38 of fluid pressure and the first port 30. The first valve body 58 also defines a valve seat 66 in the valve bore 62. The first valve 54 also includes a valve member 70 movably supported in the valve bore 62. The valve member 70 is movable between a closed position, in which the valve member 70 engages the valve seat 66 to prevent fluid flow between the first port 30 and the source 38 of fluid pressure, and an open position, in which fluid flows between the first port 30 and the source 38 of fluid pressure. The first valve 54 also includes a biasing member 74 for biasing the valve member 70 to the closed position.

The first and second valves 54 and 54' are arranged to cooperate such that, when fluid is supplied to the first port 30, fluid flows from the second port 34 to allow the piston 26 to move in one direction, for example, toward the retracted position (to the left in FIG. 1A) and such that, when fluid is supplied to the second port 34, fluid flows from the first port 30 to allow the piston 26 to move in the opposite direction, for example, toward the extended position (to the right in FIG. 1A). To enable the first and second valves 54 and 54' to cooperate, the valve arrangement 10 further includes a cooperating plunger member 78 positioned between the first and second valves 54 and 54'. The cooperating plunger member 78 includes a first plunger 82 and a second plunger 86 connected to opposite sides of a central piston portion 88. A seal assembly 90 is supported on the piston portion 88 to prevent fluid from flowing between the opposite sides of the plunger member 78.

Figure 1B:
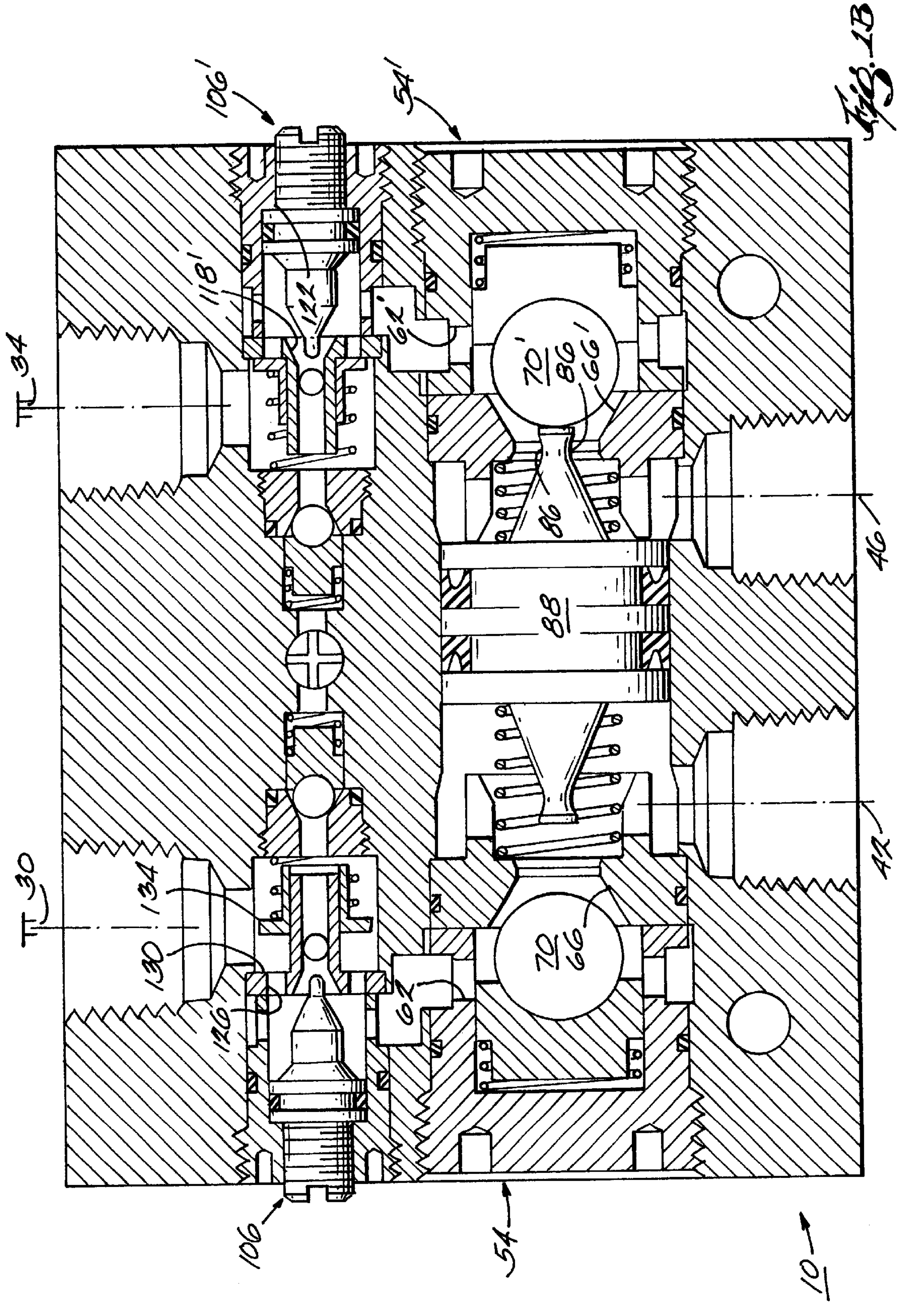

A biasing arrangement is provided to bias the plunger member 78 to a neutral position (shown in FIG. 1A). The biasing arrangement includes a first spring 94 engaging the first side of the plunger member 78 and a second spring 98 engaging the second side of the plunger member 78. When fluid is supplied through the first supply line 42 to the first valve 54 (as shown in FIG. 1B), fluid pressure on the first face of the piston portion 88 causes the plunger member 78 to move to the right. As the plunger member 78 moves to the right, the second plunger 86 engages the second valve member 70' to move the second valve member 70' to the open position.

Figure 1C:
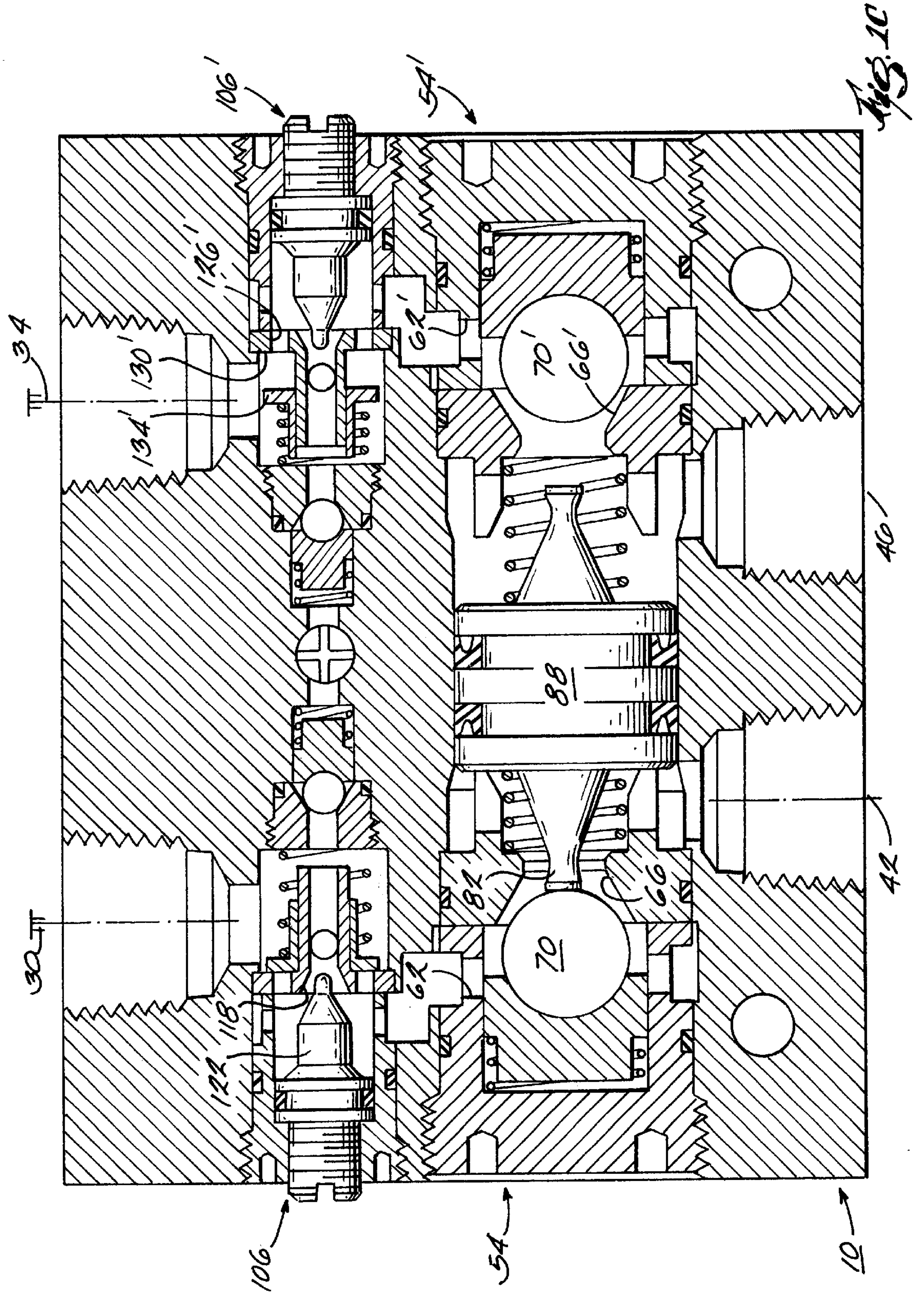

Alternatively, when fluid is supplied from the second supply line 46 to the second valve 54' (as shown in FIG. 1C), fluid pressure on the second face of the piston portion 88 causes the plunger member 78 to move to the left. As the plunger member 78 moves to the left, the first plunger 82 engages the first valve member 70 to move the first valve member 70 to the open position. When fluid is not supplied to the valve arrangement 10 (as shown in FIG. 1A), the biasing arrangement biases the plunger member 78 to the neutral position so that the first plunger 82 does not engage the first valve member 70 and so that the second plunger 86 does not engage the second valve member 70'.

In the illustrated construction, the valve arrangement 10 includes a flow control valve assembly 102 to control fluid flow to the source 38 of fluid pressure from at least one of the first and second ports 30 and 34. It should be understood that, in other constructions (not shown), the valve arrangement 10 may not include such a flow control valve assembly.

In the illustrated construction, the flow control valve assembly 102 includes a first flow control valve 106 in fluid communication with the first valve 54 to control fluid flow from the first port 30 to the source 38 of fluid pressure and a second flow control valve 106' in fluid communication with the second valve 54'to control fluid flow from the second port 34 to the source 38 of fluid pressure. The first and second flow control valves 106 and 106' are identical, and, accordingly, only the first flow control valve 106 will be described in detail. Common elements of the second flow control valve 106' are identified by the same reference number "'".

The first flow control valve 106 includes a flow control valve body 110 defining a flow control valve bore 114 and a flow control valve seat 118. A flow control valve member 122 is movably supported in the flow control valve bore 114. The flow control valve member 122 is selectively positionable relative to the flow control valve seat 118 to selectively limit fluid flow from the first port 30 to the source 38 of fluid pressure through the flow control valve bore 114.

The first flow control valve 106 also includes a bypass valve bore 126 in fluid communication with the first valve bore 62 and with the first port 30 and a bypass valve seat 130. The first flow control valve 106 further includes a bypass valve member 134 movable between a closed position, in which the bypass valve member 134 engages the bypass valve seat 130 to prevent fluid flow through the bypass valve bore 126, and an open position, in which fluid flows from the first valve bore 62, through the bypass valve bore 126, and to the first port 30. A biasing member 138 biases the bypass valve member 134 to the closed position.

Figure 3A:
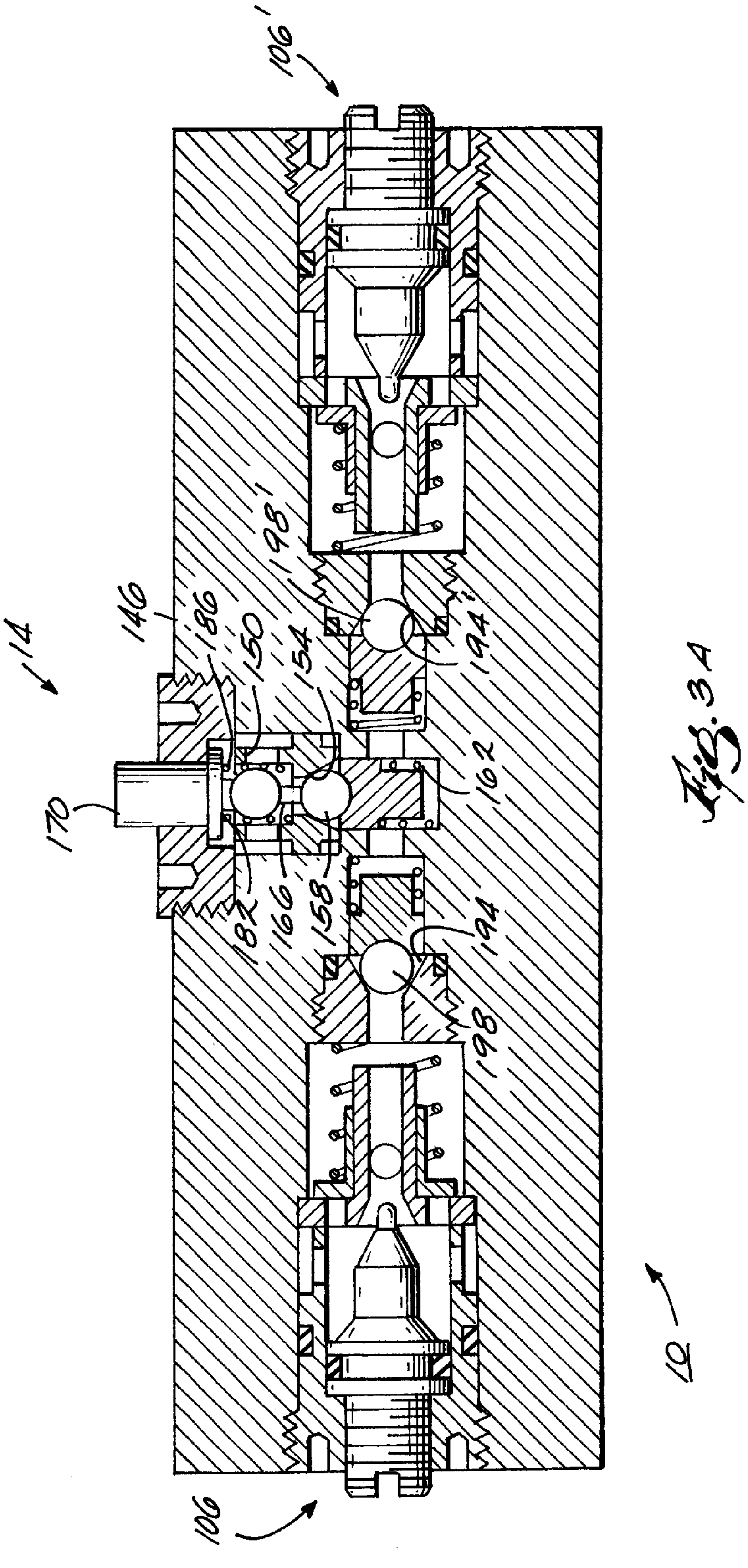
FIGS. 3A and 3B are partial cross-sectional views taken generally along line 3—3 in FIG. 2 and illustrating the operational conditions of the release valve.
Figure 3B:
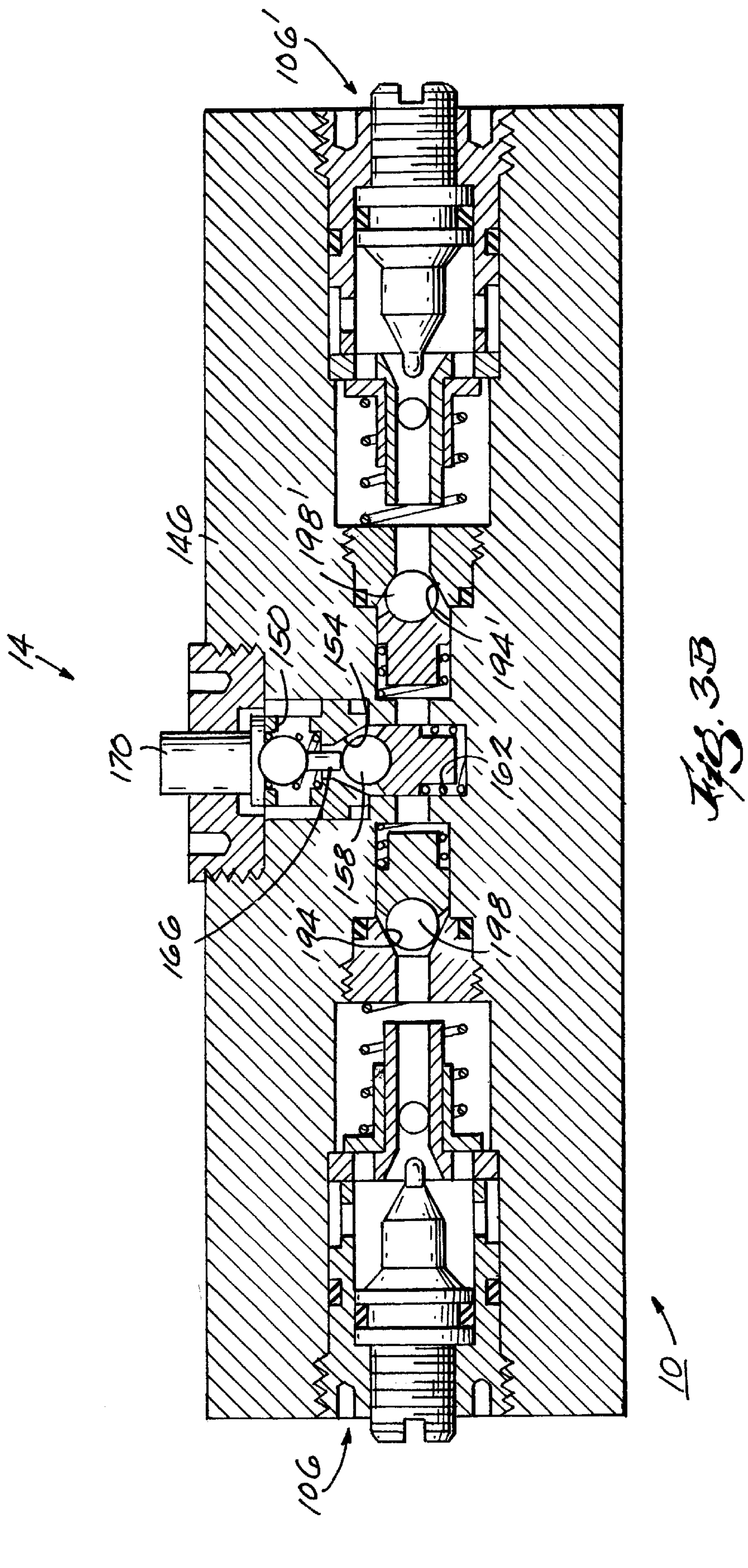

As shown in FIGS. 2, 3A and 3B, the release valve 14 includes a release valve body 146 defining a release valve bore 150 having an exhaust port 152. The release valve body 146 also defines a release valve seat 154. A release valve member 158 is movably supported in the release valve bore 150. The release valve member 158 is movable between a closed position (shown in FIG. 3A), in which the release valve member 158 engages the release valve seat 154 to prevent fluid flow through the release valve bore 150, and an open position (shown in FIG. 3B), in which fluid flows from at least one of the first and second ports 30 and 34 and through the release valve bore 150 to the exhaust port 152. A release valve biasing member 162 biases the release valve member 158 to the closed position.

The release valve 14 also includes (see FIGS. 2, 3A and 3B) a release plunger 166 operable to move the release valve member 158 to the open position. In the illustrated construction, the release plunger 166 is movable into engagement with the release valve member 158 to thereby move the release valve member 158 to the open position. A manually engageable portion 170 is connected to the release plunger 166, and an operator can engage the portion 170 to cause the release plunger 166 to move the release valve member 158 to the open position.

Figure 4:
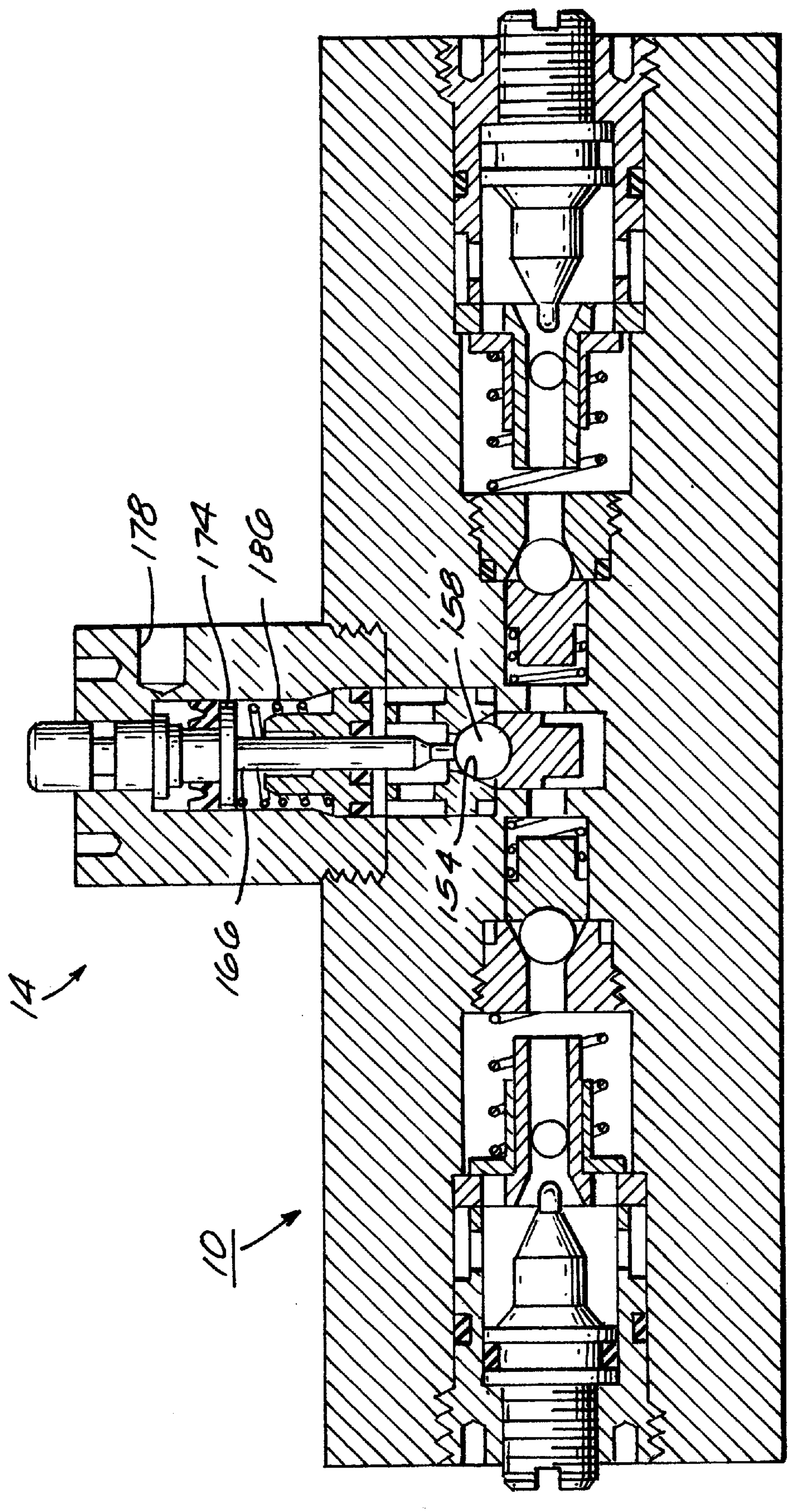
FIG. 4 is a partial cross-sectional view of a first alternative construction of the release valve illustrated in FIGS. 2, 3A and 3B.
Figure 3:
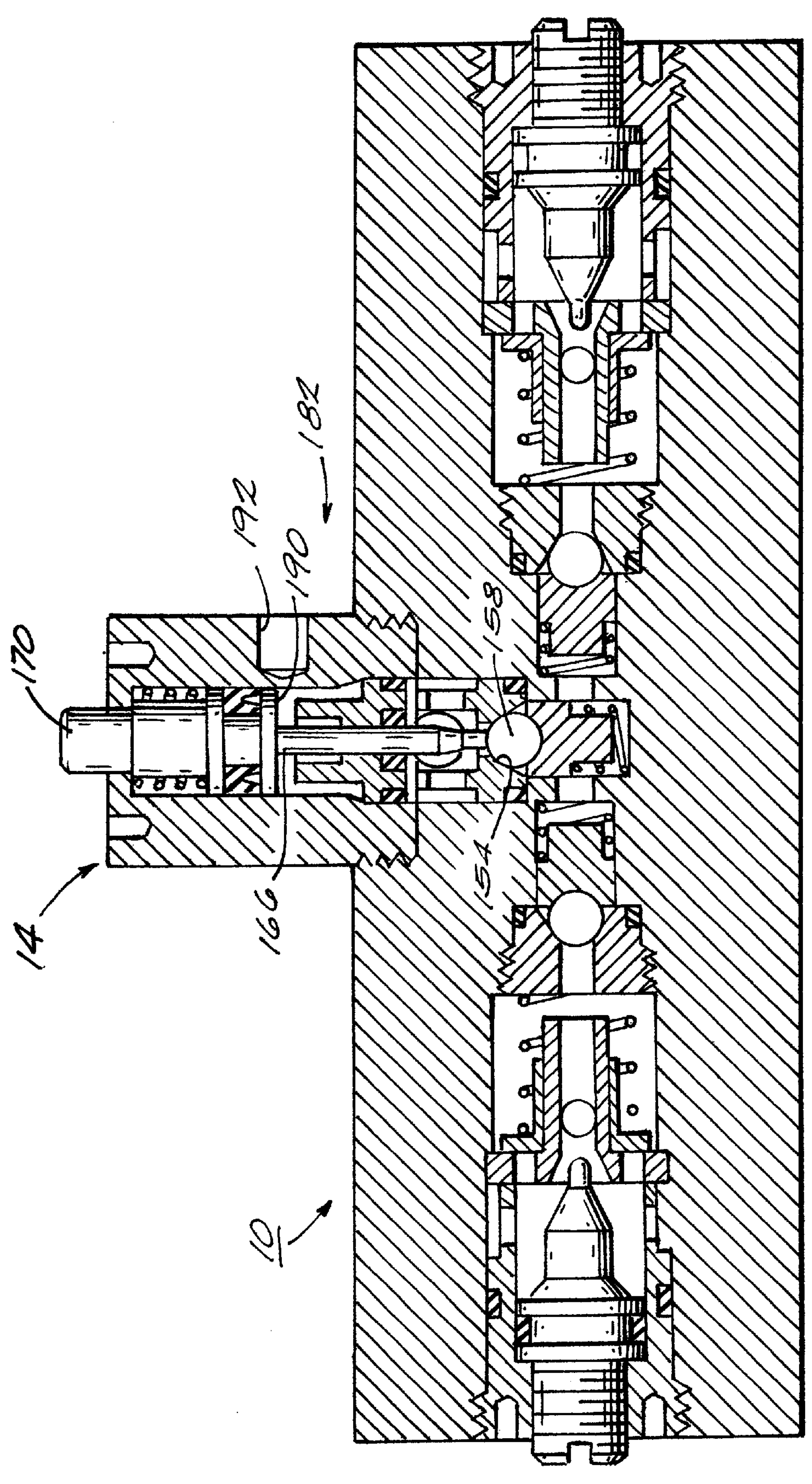

In a first alternative construction (shown in FIG. 4), the release valve 14 includes a piston portion 174 connected to the release plunger 166. A pilot fluid pressure may be applied through a pilot fluid line 178 to the piston portion 174 to cause the release plunger 166 to move the release valve member 158 to the open position.

The release valve 14 also includes means 182 for biasing the release plunger 166 out of engagement with the release valve member 158. In the construction illustrated in FIGS. 2, 3A and 3B, the biasing means 182 includes a biasing member 186 biasing the release plunger 166 out of engagement with the release valve member 158. In the second alternative construction (shown in FIG. 5), the biasing means 182 includes a piston portion 190 connected to the release plunger 166. A pilot pressure provided through a pilot line 192 and applied to the piston portion 190 biases the release plunger 166 out of engagement with the release valve member 158. In either construction, the manually engageable portion 170 is engageable by the operator to overcome the biasing force of the biasing member 178 (shown in FIGS. 2, 3A and 3B) or of the pilot fluid pressure applied to the piston portion 190 (shown in FIG. 4) to cause the release plunger 166 to move the release valve member 158 to the open position.

The release valve 14 also includes (see FIGS. 3A and 3B) means for preventing the first and second valves 54 and 54' from being in fluid communication through the release valve 14. The preventing means includes a first preventing means between the first valve 54 and the release valve 14 and a second preventing means between the second valve 54' and the release valve 14. The first and second preventing means are identical, and, accordingly, on the first preventing means will be described in detail. Common elements of the second preventing means are identified by the same reference number "'".

The first preventing means includes a secondary valve seat 194 defined between the first valve bore 62 and the release valve bore 150 and a secondary valve member 198 movable between a closed position (shown in FIG. 3A), in which the secondary valve member 198 engages the secondary valve seat 194 to prevent fluid flow between the first valve bore 62 and the release valve bore 150, and an open position (shown in FIG. 3B), in which fluid flows between the first valve bore 62 and the release valve bore 150. A biasing member 202 biases the secondary valve member 198 to the closed position.

In operation, when fluid is not supplied from the source 38 of fluid pressure to the cylinder assembly 18, the valve arrangement 10 assumes the condition illustrated in FIG. 1A, preventing movement of the piston 18 and the load, if provided. This is the locking condition of the valve arrangement 10 which is assumed upon interruption of the source 38 of fluid pressure either under the operator's control or in a condition, for example, in which a line from the source 38 of fluid pressure is damaged to cause the interruption of fluid pressure.

When fluid is supplied to the first port 30, the valve arrangement 10 assumes the condition illustrated in FIG. 1B, and the piston is moved to the retracted position (to the left in FIG. 1A). As shown in FIG. 1B, fluid pressure, supplied through the first supply line 42, moves the first valve member 70 to the open position. This fluid pressure moves the cooperating plunger member 78 to the right (in FIG. 1B) so that the second plunger 86 also moves the second valve member 70' to the open position. Fluid flows through the first valve bore 62, through the first bypass valve bore 126, if a first flow control valve 106 is provided, and to the first port 30.

At the same time, fluid flows from the second port 34, through the second flow control valve bore 114', if a second flow control valve 106' is provided, through the second valve bore 62', and to the second supply line 46. The position of the second flow control valve member 122' relative to the second flow control valve seat 118' limits the fluid flow through the second flow control valve 106' and through the second valve 54' to the source 38 of fluid pressure.

When fluid is supplied to the second port 34, the valve arrangement 10 assumes the condition illustrated in FIG. 1C, and the piston 26 is moved to the extended position (to the right in FIG. 1A). As shown in FIG. 1C, fluid pressure, supplied through the second supply line 42, moves the second valve member 70' to the open position. This fluid pressure moves the cooperating plunger member 78 to the left (in FIG. 1C) so that the first plunger 82 also moves the first valve member 70 to the open position. Fluid flows through the second valve bore 62', through the second bypass valve bore 126', if a second flow control valve 106' is provided, and to the second port 34.

At the same time, fluid flows from the first port 30, through the first flow control valve bore 114, if a first flow control valve 106 is provided, through the first valve bore 62, and to the first supply line 42. The position of the first flow control valve member 122 relative to the first flow control valve seat 118 limits the fluid flow through the first flow control valve 106 and through the first valve 54 to the source 38 of fluid pressure.

If fluid pressure is interrupted for any reason, operation of the valve arrangement 10 causes the piston 26 to be maintained in a relatively stationary position relative to the cylinder 22. Operation of the release valve 14 allows fluid pressure to be removed or bled from the system while maintaining the piston 26 in the relatively stationary position, assumed upon interruption of fluid pressure.

To release the fluid pressure from the system, the release valve member 158 is moved by the release plunger 166 to the open position (shown in FIG. 3B). The release plunger 166 may be moved into engagement with the release valve member 158 by an operator engaging the manually engageable portion 170. In the first alternative construction (shown in FIG. 4), the release plunger 166 may also move the release valve member 158 to the open position when the pilot pressure is applied to the piston portion 174.

When the release valve member 158 is moved to the open position, the fluid pressure acting on the first and second secondary valve members 198 and 198' is removed. Fluid pressure from the first and second ports 30 and 34 acts on the secondary valve members 198 and 198', respectively, to move the secondary valve members 198 and 198' to the open position. Fluid thus flows from the first and second ports 30 and 34 and through the release valve bore 150 to the exhaust port 152. In the illustrated construction, fluid flows from the first and second ports 30 and 34 simultaneously, and a substantially equal amount of fluid flows from the first port 30 and from the second port 34.

When the release plunger 166 is moved out of engagement with the release valve member 158, for example, by releasing the manually engageable portion 170, fluid pressure from the first and second ports 30 and 34 and the biasing force of the biasing member 162 moves the release valve member 158 to the closed position. Fluid pressure in the area of the release valve bore 150 between the first and second ports 30 and 34 causes the secondary valve members 198 and 198' to move to the closed position and engage the secondary valve seats 194 and 194', respectively.

Various features of the invention are set forth in the following claims.

We claim:

1. A release valve comprising:

a release valve body including a release valve bore in fluid communication with a first port and with a second port, said release valve body further including a release valve seat;

a release valve member movable between a closed position, in which said release valve member engages said release valve seat to prevent fluid flow through said release valve bore, and an open position, in which fluid flows from at least one of the first port and the second port and through said release valve bore;

a release plunger operable to move said release valve member to the open position, wherein said release plunger is engageable with said release valve member to move said release valve member to the open position; and means for biasing said release plunger out of engagement with said release valve member;

wherein said release valve body further defines a secondary release valve seat between the first port and said release valve bore, wherein said release valve further includes a secondary release valve member movable between a closed position, in which said secondary release valve member engages said secondary release valve seat to prevent fluid flow between the first port and said release valve bore, and an open position, in which fluid flows between the first port and said release valve bore.

2. The release valve as set forth in claim 1 wherein, when said release valve member is in the open position, fluid flows from both the first port and the second port simultaneously.

3. The release valve as set forth in claim 2 wherein, when said release valve member is in the open position, a substantially equal amount of fluid flows from the first port and from the second port.

4. The release valve as set forth in claim 1 and further comprising a manually engageable portion connected to said release plunger and engageable by an operator to cause said release plunger to move said release valve member to the open position.

5. The release valve as set forth in claim 1 wherein said biasing means includes a release plunger biasing member biasing said release plunger out of engagement with said release valve member.

6. The release valve as set forth in claim 1 wherein said biasing means includes a piston portion connected to said release plunger, and wherein a pilot fluid pressure is applied to said piston portion to bias said release plunger out of engagement with said release valve member.

7. The release valve as set forth in claim 6 and further comprising a manually engageable portion connected to said release plunger and engageable by an operator to overcome the pilot fluid pressure to cause said release plunger to move said release valve member to the open position.

8. The release valve as set forth in claim 1 and further comprising a secondary release valve member biasing member biasing said secondary release valve member to the closed position.

9. The release valve as set forth in claim 1 wherein said release valve body further defines a second secondary release valve seat between the second port and said release valve bore, wherein said release valve further includes a second secondary release valve member movable between a closed position, in which said second secondary release valve member engages said second secondary release valve seat to prevent fluid flow between the second port and said release valve bore, and an open position, in which fluid flows between the second port and said release valve bore.

10. The release valve as set forth in claim 9 and further comprising a second secondary release valve member biasing member biasing said second secondary release valve member to the closed position.

11. The release valve as set forth in claim 9 wherein, in the closed position, the second secondary valve member prevents fluid flow from the first port to the second port.

12. The release valve as set forth in claim 1 wherein fluid pressure from one of the first port and the second port moves the release valve member to the closed position.

13. The release valve as set forth in claim 1 wherein, in the closed position, the secondary release valve member prevents fluid flow from the second port to the first port.

14. A release valve comprising:

a release valve body including a release valve bore in fluid communication with a first port and with a second port, said release valve body further including a release valve seat;

a release valve member movable between a closed position, in which said release valve member engages said release valve seat to prevent fluid flow through said release valve bore, and an open position, in which fluid flows from at least one of the first port and the second port and through said release valve bore;

a release plunger operable to move said release valve member to the open position, wherein said release plunger is engageable with said release valve member to move said release valve member to the open position; and means for biasing said release plunger out of engagement with said release valve member;

wherein said release valve body further defines a secondary release valve seat between the first port and the second port, and wherein said release valve further includes a secondary release valve member movable between a closed position, in which said secondary release valve member engages said secondary release valve seat to prevent fluid flow between the first port and the second port, and an open position.

15. The release valve as set forth in claim 14 and further comprising a secondary release valve member biasing member biasing said secondary release valve member to the closed position.

16. The release valve as set forth in claim 14 wherein, when the release valve member is in the open position and when the secondary release valve member is in the open position, fluid flows from at least one of the first port and the second port and through the release valve bore.

17. The release valve as set forth in claim 14 wherein, in the closed position, the first-mentioned secondary release valve member prevents fluid flow from the first port to the second port, wherein said release valve body further defines a second secondary release valve seat between the first port and the second port, and wherein said release valve further includes a second secondary release valve member movable between a closed position, in which said second secondary release valve member engages said second secondary release valve seat to prevent fluid flow from the second port to the first port, and an open position.

18. The release valve as set forth in claim 17 and further comprising a second secondary release valve member biasing member biasing said second secondary release valve member to the closed position.

19. The release valve as set forth in claim 14 wherein, when said release valve member is in the open position, fluid flows from both the first port and the second port simultaneously.

20. The release valve as set forth in claim 19 wherein, when said release valve member is in the open position, a substantially equal amount of fluid flows from the first port and from the second port.

21. The release valve as set forth in claim 14 and further comprising a manually engageable portion connected to said release plunger and engageable by an operator to cause said release plunger to move said release valve member to the open position.

22. The release valve as set forth in claim 14 wherein said biasing means includes a release plunger biasing member biasing said release plunger out of engagement with said release valve member.

23. The release valve as set forth in claim 14 wherein said biasing means includes a piston portion connected to said release plunger, and wherein a pilot fluid pressure is applied to said piston portion to bias said release plunger out of engagement with said release valve member.

24. The release valve as set forth in claim 23 and further comprising a manually engageable portion connected to said release plunger and engageable by an operator to overcome the pilot fluid pressure to cause said release plunger to move said release valve member to the open position.

25. The release valve as set forth in claim 14 wherein fluid pressure from one of the first port and the second port moves the release valve member to the closed position.

26. A release valve comprising:

a release valve body including a release valve bore in fluid communication with a first port and with a second port, said release valve body further including a release valve seat and a secondary release valve seat between the first port and said release valve bore;

a release valve member movable between a closed position, in which said release valve member engages said release valve seat to prevent fluid flow through said release valve bore, and an open position, in which fluid flows from at least one of the first port and the second port and through said release valve bore; and a secondary release valve member movable between a closed position, in which said first secondary release valve member engages said secondary release valve seat to prevent fluid flow between the first port and said release valve bore, and an open position, in which, when the release valve member is in the open position, fluid flows between the first port and said release valve bore.

27. The release valve as set forth in claim 26 and further comprising a secondary release valve member biasing member biasing said secondary release valve member to the closed position.

28. The release valve as set forth in claim 26 wherein, in the closed position, the secondary release valve member prevents fluid flow from the second port to the first port.

29. The release valve as set forth in claim 26 wherein said release valve body further defines a second secondary release valve seat between the second port and said release valve bore, wherein said release valve further includes a second secondary release valve member movable between a closed position, in which said second secondary release valve member engages said second secondary release valve seat to prevent fluid flow between the second port and said release valve bore, and an open position, in which, when the release valve member is in the open position, fluid flows between the second port and said release valve bore.

30. The release valve as set forth in claim 29 and further comprising a second secondary release valve member biasing member biasing said second secondary release valve member to the closed position.

31. The release valve as set forth in claim 29 wherein, in the closed position, the second secondary valve member prevents fluid flow from the first port to the second port.

32. A release valve comprising:

a release valve body including a release valve bore in fluid communication with a first port and with a second port, said release valve body further including a release valve seat and a secondary release valve seat between the first port and the second port;

a release valve member movable between a closed position, in which said release valve member engages said release valve seat to prevent fluid flow through said release valve bore, and an open position, in which fluid flows from at least one of the first port and the second port and through said release valve bore; and a secondary release valve member movable between a closed position, in which said first secondary release valve member engages said secondary release valve seat to prevent fluid flow between the first port and the second port, and an open position.

33. The release valve as set forth in claim 32 and further comprising a secondary release valve member biasing member biasing said secondary release valve member to the closed position.

34. The release valve as set forth in claim 32 wherein, when the release valve member is in the open position and when the secondary release valve member is in the open position, fluid flows from at least one of the first port and the second port and through the release valve bore.

35. The release valve as set forth in claim 32 wherein, in the closed position, the secondary release valve member prevents fluid flow from the first port to the second port, wherein said release valve body further defines a second secondary release valve seat between the first port and the second port, and wherein said release valve further includes a second secondary release valve member movable between a closed position, in which said second secondary release valve member engages said second secondary release valve seat to prevent fluid flow from the second port to the first port, and an open position.

36. The release valve as set forth in claim 35 and further comprising a second secondary release valve member biasing member biasing said second secondary release valve member to the closed position.

* * * * *